Jan. 22, 1935.    H. SHROITMAN    1,988,973
ADJUSTABLE AND CONVERTIBLE COPYHOLDER
Filed May 9, 1934    7 Sheets-Sheet 6

H. Shroitman
INVENTOR
By Menho & Clerk
Attys

Jan. 22, 1935.   H. SHROITMAN   1,988,973
ADJUSTABLE AND CONVERTIBLE COPYHOLDER
Filed May 9, 1934   7 Sheets-Sheet 7

H. Shroitman
INVENTOR

By: Marks & Clerk
ATTYS.

Patented Jan. 22, 1935

1,988,973

UNITED STATES PATENT OFFICE 1,988,973

ADJUSTABLE AND CONVERTIBLE COPYHOLDER

Haim Shroitman, Jerusalem, Palestine

Application May 9, 1934, Serial No. 724,818
In Great Britain April 4, 1933

6 Claims. (Cl. 120—29)

This invention relates to copy-holders and has for its object to provide an improved copy-holder of the kind in which the tip or angle of the copy supporting surface can be varied as desired.

The copy-holder according to the invention can be used as a simple stand in itself or can be converted for use either with typewriters or accounting or other machines.

Mechanism is provided whereby the copy can be raised or lowered as required, so as to leave the whole of the sheet exposed, and by a simple touch the whole copy can be instantaneously dropped when, for instance, commencing a new page. Furthermore, the lifting and guiding devices embodied in this mechanism enable the copy to be raised or lowered to any desired degree.

The invention will now be described with reference to the accompanying drawings which illustrate by way of example various embodiments of the invention, and in which:—

Figure 1:
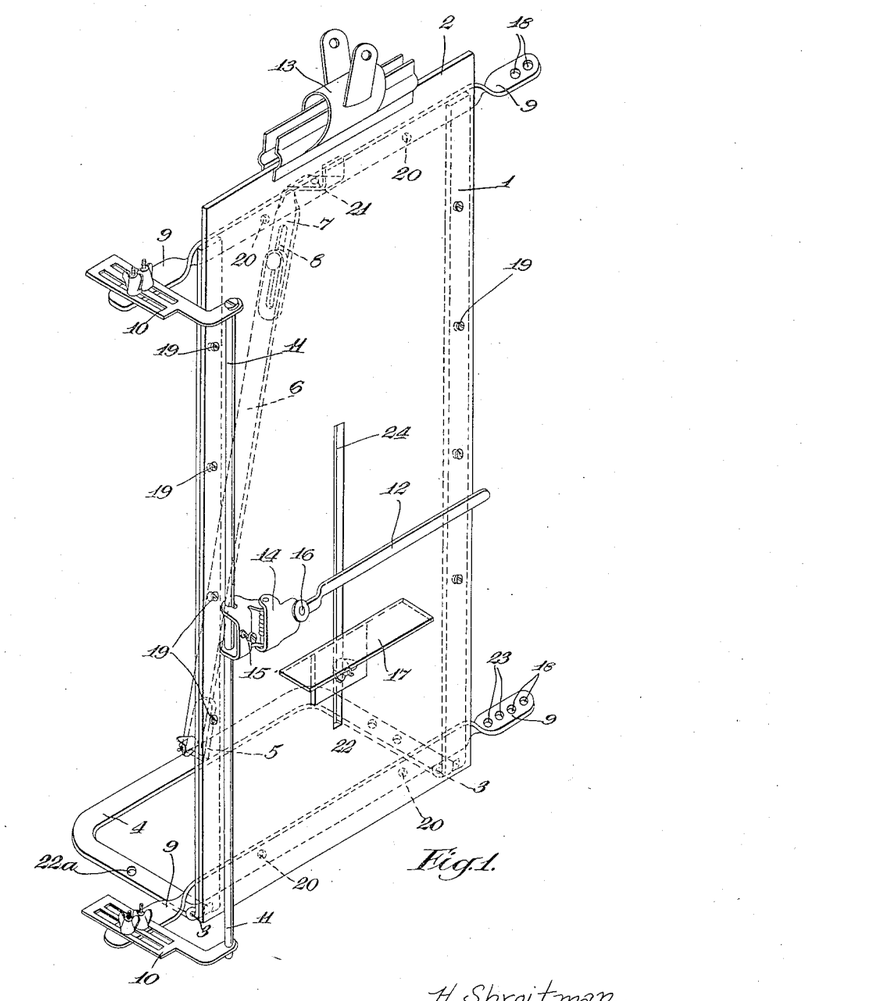
Figure 1 is a perspective view of a copy-holder constructed according to the invention when used as a simple stand.

Figure 1 of the drawings shows a copy-holder according to the invention constructed as a simple stand comprising a main frame 1 to which a flat piece of metal or other material forming the copy plate or table 2 is screwed at 19.

To the bottom of the main frame 1 is attached, by means of hinges 3, a subsidiary frame 4 which functions as the feet or rest of the copy-holder, and which, in the case of heavy documents being used, may be weighted or screwed to a suitable table in order to prevent the stand over-balancing. To the centre of the rear part of the subsidiary frame 4 there is affixed a lug 5 to which the lower end of an adjustable support 6 is pivotally secured.

To the top of the frame 1 is attached a lug 7 which is formed with a slot 8 in which a thumb screw or other screw, carried by the upper end of the support 6, can be adjustably secured, so that, when the position of the screw in the slot 8 is varied, the frame 1 moving on its hinges 3 alters its angle of inclination which can thus be varied according to the wishes of the user.

The main frame 1 has four laterally projecting lugs 9, one at each of its four corners, and on these lugs are adjustably secured, by means of bolts, the line guide rod supports, the column guide rod supports and other accessories to be fully described hereinafter.

On either the lugs 9 projecting to the left as shown in the drawings or those projecting to the right of the main frame 1, according to the desires of the user, are adjustably bolted brackets 10 which function as supports for a rod 11. Preferably the brackets 10 are each formed with two slots for the passage of the connecting bolts, but one such slot only may be formed in each bracket if desired. A rod 11a (Figure 2) can be supported by means of similar brackets 25 adjustably bolted to the two lugs 9 at the top corners of the main frame 1.

The ends of the brackets 10 carrying the rod 11 are shown in the drawings as extending towards the right, but if desired these brackets may be arranged so that the said ends extend towards the left and thus enable a wider document to be arranged on the plate or table 2.

Two holes 18 formed in the extreme end of each of the lugs 9 projecting to the right of the main frame 1 allow the rod 11 with all its accessories to be transferred to the right-hand side of the main frame if required.

Figures 2, 3, 3A, 3B, 3C, 3D:
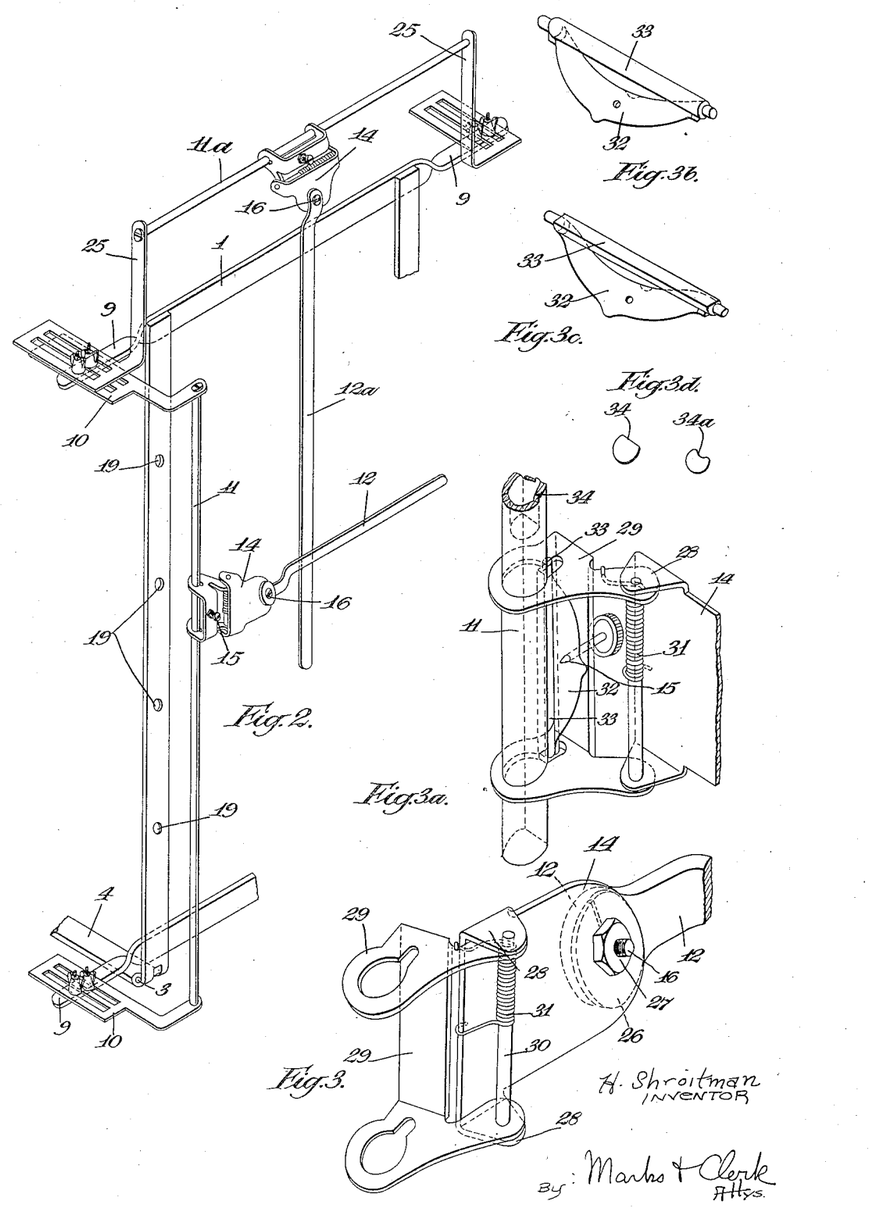
Figure 2 is a fragmentary perspective view showing the line guide support and line guide, the column guide rod and column guide, and the relation between column and line guides.
Figures 3, 3A, 3B, 3C and 3D are detail views of the line guide or column guide mechanism.

The rods 11 and 11a, by means of mechanism to be hereinafter described, carry the line guide 12 and the column guide 12a respectively.

At the top of the plate 2 is a copy clip 13 which can be of the ordinary bull-dog type as shown in Figure 1 or of any other approved type, while a paper support 17, serving the purpose of maintaining the required papers in position, is adjustably mounted on the front face of the plate 2 by a bolt or screw mounted in a slot 24 formed in the said plate.

Holes 19, formed in both the frame 1 and the plate 2, enable them to be secured together by suitable screws, whilst four holes 20 formed two in each of the horizontal upper and lower parts of the main frame, a hole 21 formed in the lug 7, two holes 22 formed in the right-hand part of the subsidiary frame 4, a hole 22a formed in the left-hand part of the latter, and holes 23 formed in the bottom right-hand lug 9 are provided for purposes to be hereinafter described.

From Figure 2 it will readily be seen that when the line guide 12 and the column guide 12a are used together, the actual line to be copied is indicated by the line guide, while the actual letter or figure to be copied is indicated by the intersection of the guides.

This is particularly useful for copying lines of figures where extreme care is required, for instance, where subject-matter referring to particular figures appears on the extreme left of the copy and the figures themselves appear on the extreme right.

The line guide 12 and its supporting rod 11 are similar in construction to the column guide 12a and its supporting rod 11a, and as the mechanisms for mounting these guides on their respective rods are identical, only that for mounting the line guide on its supporting rod will be described.

This mechanism is more clearly described with reference to Figures 3, 3A, 3B, 3C and 3D. The line guide 12 is affixed to a plate 14 by means of a bolt 16, a spring washer 26 and a lock nut 27 which enable the line guide to be moved through an angle of 90° either upwardly or downwardly into a vertical position when not being used.

The plate 14 has two projecting lugs 28 to which is pivotally secured a bracket 29 by means of a pin 30. On the pin 30 is a coil spring 31 which serves to keep the plate 14 in position and to maintain the line guide pressed flat against the copy.

In the centre of the bracket 29 is an adjustable thumb screw 15 to which is affixed a flat spring 32 which presses on a small metal key 33, and the latter in turn presses against the line guide rod 11 so that, as the pressure exerted on the flat spring 32 by the adjustable screw or handle screw 15 increases, so the frictional resistance to relative movement between the metal key 33 and the line guide rod 11 becomes greater to a point of complete lock. The metal key 33, by resting on the flat face 34 of the guide rod 11, serves to hold the bracket 29 in position on the guide rod.

The line or column guide rods can be formed with either a flat face as shown at 34 or a groove as shown at 34a, Figure 3D. The only consequential difference entailed in the line and column guide mechanisms would be the metal keys 33 which would have to be formed with either a round surface, as indicated in Figure 3B, for co-acting with the groove 34a, or a flat surface, as indicated in Figure 3C, for co-acting with the flat face 34.

Figures 4, 5:
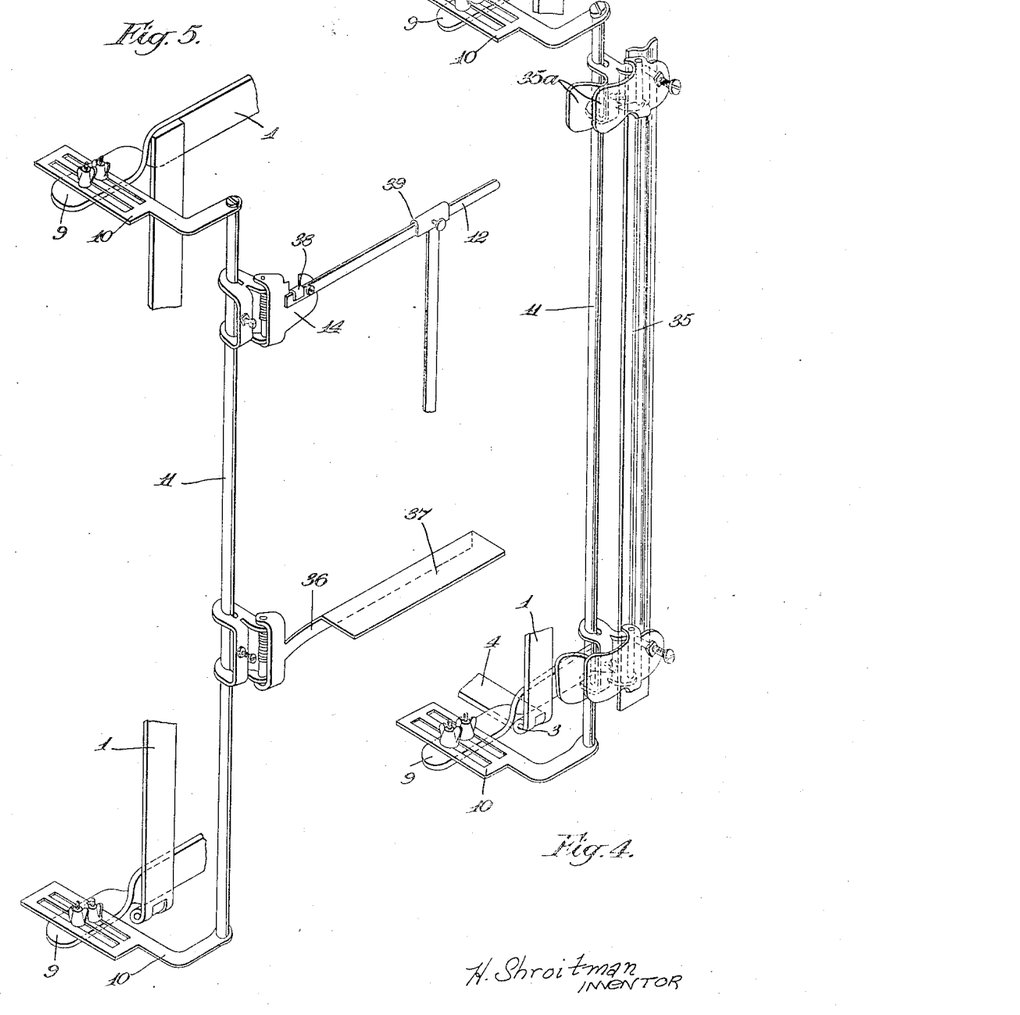
Figure 4 is a perspective view of an adjustable paper clip operating on the line guide support.
Figure 5 is a perspective view of an adjustable paper rest operating on the line guide support, a line guide stop, and a column guide moving on the line guide.

The line guide rod 11 is not only used as a rail for the line guide 12 but also for an adjustable paper clip and for an adjustable paper rest. Referring to Figure 4, the adjustable paper clip, indicated by 35, is composed of a strip of metal shaped so that the face presented to the papers has a concave centre, and is mounted at each end on the rod 11, by means of mechanism similar to that for mounting the line or column guides, as shown in Figure 3, and previously described, with the exception that finger grips in the form of projections 35a are provided to enable the clip 35 to be raised from the papers by pressing the associated finger grips together.

The adjustable paper clip 35 may be alternatively mounted in the same way on the column guide rod 11a in addition to the column guide 12a shown in Figure 2.

Figure 5 shows an adjustable paper rest which is indicated by 36 and which is also mounted on the line guide rod 11 in a similar manner and with similar spring mechanism to the line guide 12. The paper rest 36 is composed of a strip of steel with a bent over flange 37.

The line guide 12 shown in this figure cannot be moved angularly downwards from its horizontal position owing to the stop 38 on the plate 14, but can of course be moved angularly upwards into a vertical position.

On this line guide 12 is adjustably mounted a column guide 39, the length of which is usually 2 to 4 centimetres, because it is carried by the line guide 12 which moves up and down, and therefore it cannot be very extensive in length.

Figure 6:
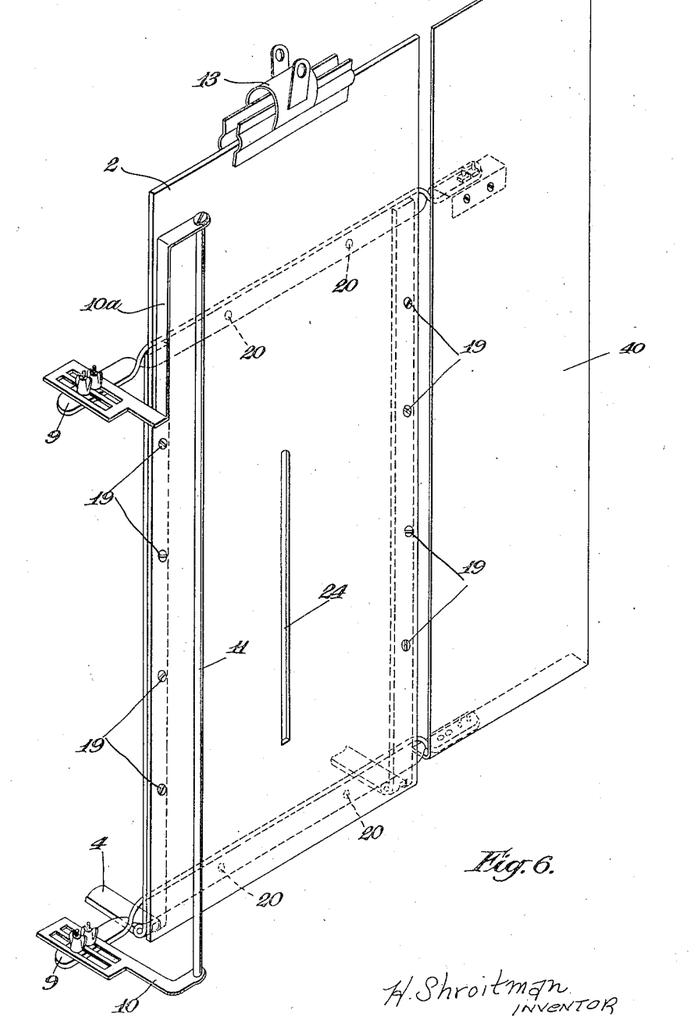
Figure 6 is a perspective view of means for increasing size of holder for different widths and lengths of the copy.

As shown in Figure 6 it is a simple matter to make the copy holder hereinbefore described wider and/or longer when used as a simple stand, for the purpose of accommodating different sized documents.

In order to make the copy holder longer it is only necessary to change the parts 10, 11 and 2, Figure 1, for the corresponding but longer parts shown in Figure 6, whereas in order to make the copy holder wider it is only necessary to add the auxiliary plate 40 to the plate 2 or to provide a wider plate 2 and to add a longer line guide 12 to extend over the whole width of the wider plate.

Figures 9, 10, 10A:
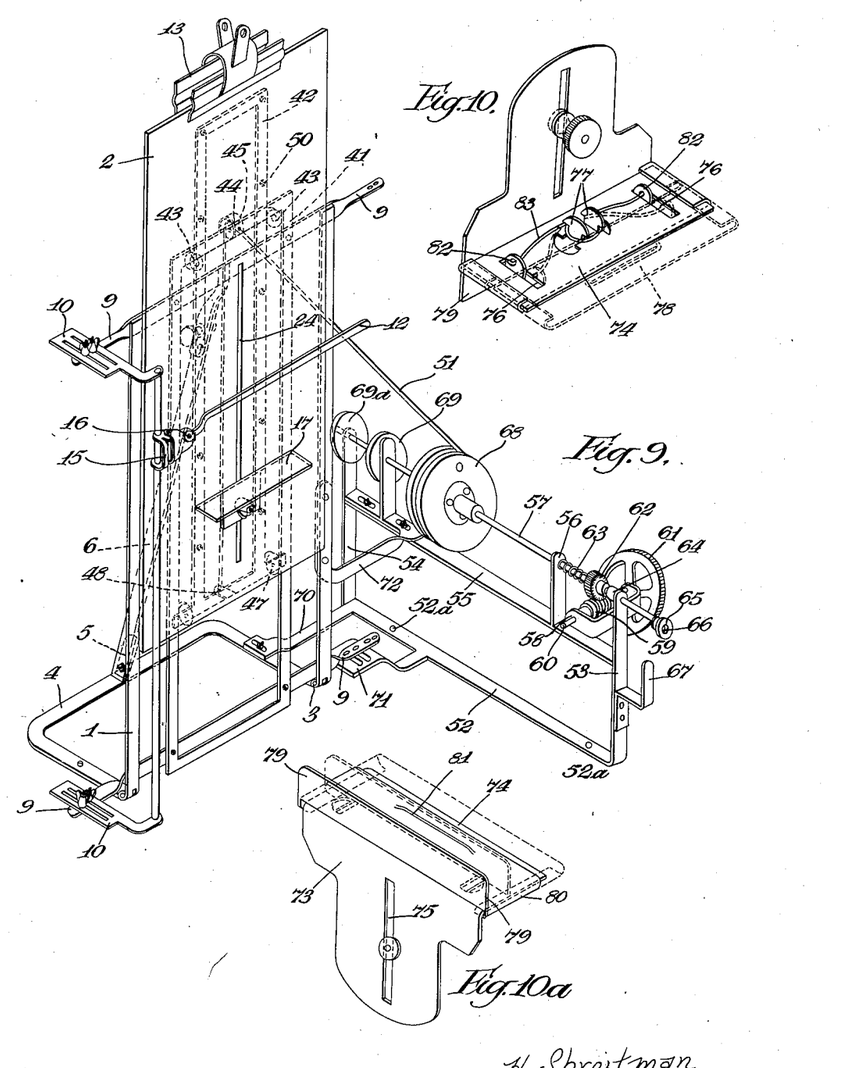
Figure 9 is a perspective view of a complete copy-holder, converted for use with a typewriter.
Figures 10 and 10A are detail views of the paper rest and clip.

The paper rest and clip shown in Figures 10, 10A may be used in conjunction with the copy holder being described.

This rest is made from a piece of metal bent at a right angle, as shown, and arranged so that the lower part 73 faces the plate 2, Figure 1, and the upper part 74 projects forwardly and forms a ledge. The part 73 of the rest is formed with a long slot 75, whereby it is fastened to plate 2 by means of a thumb screw which permits the rest to be adjusted in an upward or downward direction.

The projecting part 74, Figure 10A is formed with two slots 76 arranged respectively to the right and left of the centre of the rest and is used for holding the spring clip hereinafter described.

In the centre of the part 74, Figure 10 two portions 77 are cut and bent upwardly, these portions serving as holders for a spring 83.

The actual clip which is indicated by 78 and is also of metal, is fastened to the part 74 of the rest by its extreme right and left hand edges, which are bent over and embrace the ends of the part 74, whilst the inner edge of the clip 78 is bent up in order to form a paper holding portion, as shown at 79, Figure 10A. The underside of this clip 78 is indented so as to form a projection on the upperside which serves as a finger grip and enables the clip to be pulled out when paper is being placed on the plate 2, Figure 1. This finger grip is shown at 81, Figure 10A.

Two tongue portions 82, Figure 10, cut out in the clip, are bent up and inserted into the slots 76 formed in the part 74, and these tongue portions serve the purpose of limiting the movement of the whole clip 78, and at the same time form projections to which the spring 83 is fastened. This spring 83 is wound round the projecting portions 77 of the part 74 and the extremities are then fastened respectively to the projecting portions 82 of the clip 78. It will thus be seen that after the clip 78 has been pulled out against the action of the spring 83 to enable papers to be placed behind the raised portion 79, the spring 83 will force the clip 78 back against the papers and hold them in place.

As the parts of the copy holder according to the invention when used as a simple stand, have now been described, a manner in which this stand can be converted for use in conjunction with a typewriter will now be described.

In the first place the copy plate or table 2, Figure 1, is unscrewed from the main frame 1 and secured to a lifting frame forming part of a combined lifting and guiding framework hereinafter described. If holes are formed in the plate 2 to enable it to be attached to the lifting frame aforesaid, then this plate with its accessories can be transferred as a whole to the said frame.

Figure 7:
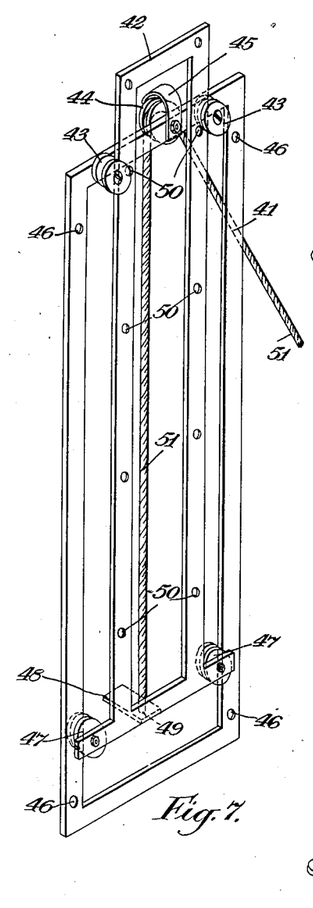
Figure 7 is a perspective view of the combined lifting and guiding framework associated with the copy support.

The combined lifting and guiding framework consists of two frames 41 and 42 movable in relation to each other and arranged as shown in Figure 7, the frame 41 being termed the guiding frame, and the frame 42 being termed the lifting frame.

On the front face of the top part of frame 41 are mounted, by means of screws, two grooved wheels 43 between which, on the rear face of the top of frame 41, is mounted a third grooved wheel 44 for the passage of a lifting cord, the latter wheel being overhung by a piece of metal 45 which is secured to the top part of the frame 41 and prevents the cord from slipping off the wheel 44.

The frame 41 is provided with four holes 46 which enable it to be secured to the main frame 1, Figure 1, by means of screws or bolts passing through the holes 46 and through the holes 20 formed, as previously indicated, in the main frame.

The frame 42 is movable within the grooves of the wheels 43 mounted on the frame 41, and on the bottom of frame 42 are formed two projections, on the rear side of which are mounted, by means of screws, wheels 47 adapted to run on the inside edge of frame 41, which thus forms rails for the said wheels. In the middle of the bottom part of frame 42 is a lug 48 provided with a hole 49, located in a direct line with the left hand edge of wheel 44.

On both side portions of the frame 42 are formed four holes 50 which enable it to be secured to plate 2. In view of the position occupied by the wheels 43 it is necessary for washers to be interposed between the frame 42 and the plate 2. It will be seen that the frame 42 carrying the plate 2 is, by reason of the wheels 43 and 47, capable of free movement in relation to the frame 41, but is prevented from being inadvertently detached therefrom.

Wheels 43, 44 and 47 are mounted on their respective frames 41 and 42 by means of screws which permit the wheels to be adjusted, or alternatively the screw holes may be sufficiently wide to permit such adjustment.

The cord 51 is fastened to the lug 48, passes through the hole 49 therein, proceeds therefrom through the hole 21 formed in lug 7 of the main frame 1 (Figure 1) and passes thence over the centre wheel 44, before being connected to lifting mechanism shown in Figure 9.

Figure 8:
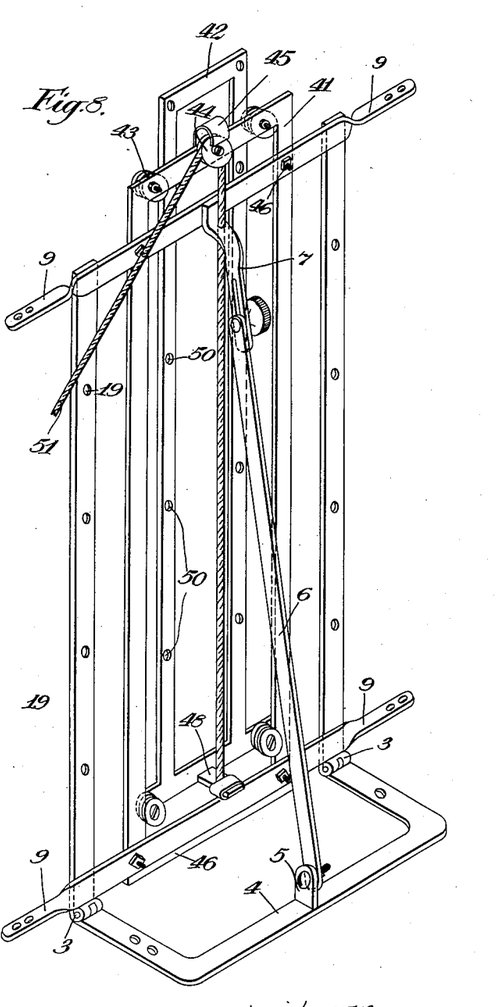
Figure 8 is a rear perspective view of the combined lifting and guiding framework attached to the main frame.

The lug 48 is covered with rubber, cloth or other material as indicated in Figure 8, in order to prevent undesirable noise when the lug contacts with the main frame upon the frame 42 being allowed to drop. The lug 48 thus serves the dual purpose of anchoring the cord and preventing noise.

The remaining parts of the copy holder being described are similar to those employed in the embodiment shown in Figures 1 to 6.

The lifting mechanism illustrated in Figure 9 comprises a frame constructed of iron or other suitable material, and composed of a member bent to form a foot 52 with uprights 53 and 54 at its ends, and a cross bar 55 forming the upper side of the frame. The uprights 53 and 54 are extended upwards beyond the cross bar 55 whilst a piece of iron 56, fixed on the cross bar 55, forms with the extensions of the sides 53 and 54, the bearings for a control rod 57.

Bolted on to the upright 53 of the mechanism frame is a bracket 58, which houses a worm screw 59 secured to a spindle 60 which is journalled in the bracket 58 and is secured to an operating wheel 61. On the control rod 57 is pinned a cog wheel 62 which normally meshes with the worm 59, and between the cog wheel 62 and the iron support 56 is a spring 63. This spring 63 serves to maintain the control rod in a position in which the cog wheel 62 meshes with the worm 59 whilst a collar 64 on the control rod prevents the cog wheel 62 being thrust by the spring too far towards the projection of the frame side 53. Thus the control rod 57 can be turned by means of the operating wheel 61 through the engagement of the worm 59, which is a fixture on the spindle 60, with the cog wheel 62, which in its turn is a fixture on the control rod 57. The worm 59, the cog wheel 62, and the spring 63 may be enclosed if desired by a thin metallic housing (not shown) for preventing access of dust, and at the same time affording protection for the operator's fingers.

In order to allow the copy plate to drop quickly without the necessity of turning the operating wheel 61, which, owing to the reduction gear constituted by the worm screw 59 and the cog wheel 62, can only turn the control rod slowly, the control rod 57 can be pushed forward, through the agency of a thumb knob 65, against the action of the spring 63 to disengage the cog wheel 62 from the worm screw 59. The weight of the copy plate and its accessories will then cause it to descend immediately. The thumb knob 65, although held in its axial position by a screw 66, is nevertheless freely rotatable on the control rod 57 and can thereby remain stationary when the control rod suddenly turns due to the gearing being disengaged.

On the outer frame upright 53 is affixed a bracket 67 which serves as a grip for the fingers of the operator when the knob 65 is being pushed forward.

The control rod 57 carries a main cord wheel 68 to which the free end of the cord 51 is secured and upon which the cord is wound when the copy plate is being raised. This main cord wheel 68 is, moreover, grooved sufficiently to accommodate the whole of the cord. The control rod 57 also carries a brake disc 69 which is suitably bolted on the said rod.

Upon the knob 65 being pressed, the rod 57 is pushed forward and carries with it the cog wheel 62, the main cord wheel 68, and the brake disc 69, which latter is thus caused to approach a stationary brake disc 69a of the same size bolted to the upright 54 of the lifting mechanism frame.

On the side of the brake disc 69 facing the brake disc 69a is attached an annular piece of leather or other material in order to ensure a satisfactory frictional engagement between the brake discs 69 and 69a when they contact with each other. The operator by suitably pressing the knob can thus regulate the braking pressure exercised by the stationary brake disc 69a on the movable brake disc 69 so that the plate 2 with its accessories and contents fall as slowly as required.

When the handle is turned in a clockwise direction the worm screw 59 is turned and operates the rod 57 through the cog wheel 62, thus turning the main cord wheel 68. When the main cord wheel is turned it will be seen that the cord is wound thereon and as the cord is also secured to the lifting frame 42, the latter and its accessories are thus raised.

As will be seen from Figure 9 the foot 52 of the frame is formed with two projections 70 and 71 provided with slots which enable them to be adjustably attached respectively to the subsidiary frame 4 and the main frame 1 (Figure 1) by means of bolts passing through the slots in the said projections and through either of the holes 22 and the holes 23 formed respectively in the auxiliary frame 4 and the right hand bottom lug 9 of the main frame. This attachment is supplemented by a member 72 which is adjustably secured to the cross bar 55 and can be secured at its free end to the main frame 1 by means of screws passing through holes 19 in the main frame.

Although the projection 71, as shown, is provided with two slots to enable it to be attached to the main frame, one such slot only may be provided if desired.

The hole 22a formed in the auxiliary frame 4, and the holes 52a formed in the foot 52 of the lifting mechanism frame, Figure 10 are for use in screwing the complete copy holder to a suitable table or desk. When, however, the copy holder is used as a simple stand as shown in Figure 1, then it is secured to a suitable table by means of screws passing through the holes 22 and 22a of the auxiliary frame 4.

It will be understood that the direction of rotation of the cord wheel 68 during the winding on of the cord 51 depends upon whether a right hand or left hand worm screw 59 is employed, and either may be used as required.

In order to enable the lifting frame 42 and the copy-carrying plate 2 to be raised quickly in steps of a predetermined amplitude, for example, the distance between the lines of figures or letters to be copied, a ratchet wheel or other toothed wheel 73 (Figure 11) is secured in co-axial relationship to the worm 59 and/or to the spindle 60 which loosely carries a radial arm 74 made from a flat piece of metal. This radial arm carries a pivoted pawl 75 and a fixed projection or stop 76 for limiting the pivotal movement of the pawl in a clockwise direction. Normally, the nose of the pawl is clear of the ratchet-wheel 73, whilst a shoulder 75' formed at the end of the pawl remote from its nose abuts against the stop 76. The nose of the pawl 75 is brought into engagement with the teeth of the ratchet-wheel 73 upon the pawl being moved relatively to the radial arm in a counter-clockwise direction about its pivot 75''. The effort for producing this turning movement is exerted on the end of the pawl remote from its nose by means of a strong wire 77 connecting the pawl to a pivoted spacing lever 78 which normally occupies the position shown but which can be moved downwardly by the operator when desired. The first effect of this downward movement of the spacing lever is to move the pawl in the manner indicated above until its nose engages the ratchet-wheel, whereupon further downward movement of the spacing lever will cause the ratchet-wheel 73, the worm 59, the radial arm 74, and the spindle 60, to turn as a single unit about the axis of the spindle through an angular distance determined by the amplitude of the downward movement imparted to the spacing lever.

Figures 11, 13:
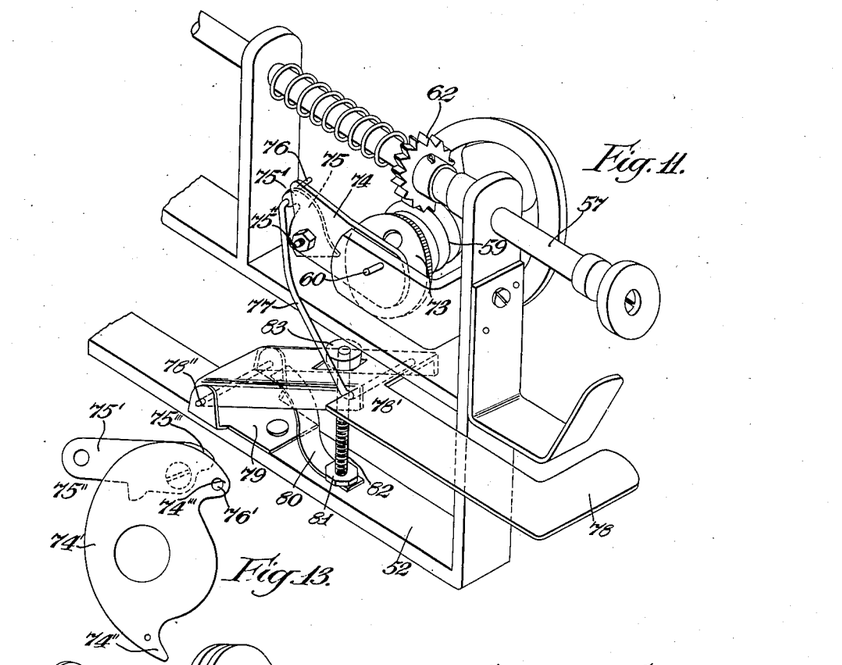
Figure 11 is a perspective view of means for imparting step-by-step movements to the lifting frame.
Figure 13 is a detail view.

The spacing lever 78 is pivotally supported by a bracket 79 secured to the foot 52 of the device, and is normally retained in its initial or upper position by means of a flat spring 80 abutting at one end on the underside of the spacing lever and being secured at the other end to the foot 52.

The attachment between the spring 80 and the foot 52 is effected by means of a nut 81 on a screw 82 passing through the foot and through the spring. The screw 82 passes through an aperture 78' in the spacing lever 78 and has screwed on its upper end a circular nut 83 which may be adjusted to vary the distance through which the spacing lever can be moved in accordance with the distance between the lines to be copied.

From the foregoing it will be seen that upon pressure being exerted on the spacing lever a predetermined angular movement is imparted to the main cord wheel 68 through the agency of the wire 77, pawl 75, ratchet-wheel 73, worm 59, pinion 62, and control rod 57. Upon the spacing lever being released it is returned to its initial position automatically under the action of the spring 80. During the return movement the wire 77 first causes the pawl 75 to turn in a clockwise direction about its pivot until it is disengaged from the ratchet-wheel 73 and is arrested by the shoulder 75' engaging the stop 76, and then causes the radial arm 74 to be restored to its initial position.

Figure 12:
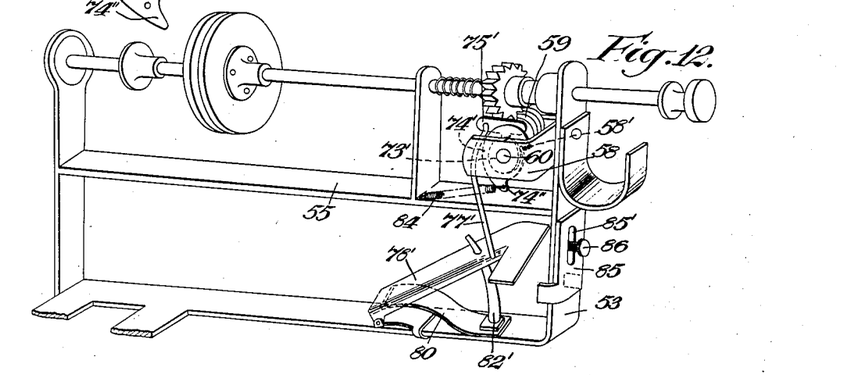
Figure 12 is a perspective view of a modification.

In the modified arrangement shown in Figures 12 and 13, the radial arm 74 of Figure 11 is substituted by an irregularly shaped plate 74' having a pair of beaks 74'' and 74''' and carrying a pivoted pawl 75'. The plate 74' is loosely pivoted on the spindle 60 and is normally maintained in the position shown by means of a spring 84 attached at one end to the beak 74'' and at the other end to the scross bar 55. In this position the beak 74''' abuts against a stop 58' provided on the bracket 58 and the nose 75'' of the pawl 75' is clear of the ratchet-wheel 73' which is secured in co-axial relationship to the worm 59. As before, one end of the pawl is connected by means of a strong wire 77' with a pivoted spacing lever 78' which upon being depressed first causes the nose of the pawl to be brought into engagement with the teeth of the ratchet-wheel, and then causes the plate carrying the pawl, the ratchet-wheel, the worm and its supporting spindle to turn as a single unit about the axis of the spindle against the action of the spring 84. The extent of the latter movement is controlled by an abutment member 85 adjustably secured to the upright 53 by means of a screw 86 passing through a slot 85' formed in the abutment member 85. The abutment member is provided with lugs 85'' which project into the path of the spacing lever and thereby limit its downward movement. By adjusting the position of the abutment member 85 the distance through which the spacing lever 78', and consequently the pawl 75', is moved can be varied at will.

Upon the spacing lever being released, after having been depressed into its lowermost position, it returns to its upper or initial position under the action of the spring 80, as in the previous arrangement, and thereby causes the pawl to be moved about its pivot until the nose of the pawl is disengaged from the teeth of the ratchet-wheel and further movement of the pawl relatively to its supporting plate is prevented by a projection 75''' on the pawl meeting a stop carried by the beak 74''' of the plate 74', whereupon the plate is restored to its initial position by the continued return movement of the spacing lever assisted by the action of the spring 84. An arcuate spindle 82' secured to the foot 52 and passing through a hole in the spacing lever functions as a guide for the latter.

Instead of the abutment member 85, the screw 82 and nut 83 shown in Figure 11 may be employed in the arrangement shown in Figure 12 for limiting the downward movement of the spacing lever, the nut 83 in this case being located beneath the spacing lever.

The form of the spacing lever shown in Figure 12 is different from that shown in Figure 11 but any suitable form of spacing lever may be employed in either case.

It is to be understood that the invention is not limited to the constructional details described above since these may be varied to suit requirements. For example, the spring 80 may be constructed as a helical spring associated with the spindle 78'' pivotally connecting the spacing lever 78 with the bracket 79. Furthermore, the bracket 79 may be secured in any suitable position other than on the foot 52 of the device. In addition the guiding frame 41 may be dispensed with, in which case, the wheels 43 and the pulley 44 with its guard 45 will be transferred to the main frame 1.

Having now described my invention, what I claim as new and desire to secure by Letters Patent is:—

1. In combination with a copy-holder having a movable copy-carrying part, an adjusting device for raising and lowering the said part, which adjusting device comprises a rotatable control rod, a drum mounted on the control rod, a cord connected to the drum and to the copy-carrying part, a pinion also mounted on the control rod, a worm engaging the pinion, and means for imparting rotation to the worm.

2. A combined copy-holder and adjusting device as claimed in claim 1, in which the control rod is provided with a thumb knob and is movable axially under the action of pressure exerted on the thumb knob.

3. A combined copy-holder and adjusting device as claimed in claim 1, in which the means for imparting rotation to the worm comprise a toothed wheel in co-axial relationship and secured to the worm, a member pivoted on the axis of the toothed wheel, a pawl pivoted on the said member and adapted to be moved relatively thereto into engagement with the toothed wheel, and a manually operable pivoted lever connected to the pawl.

4. A combined copy-holder and adjusting device as claimed in claim 1, in which the means for imparting rotation to the worm comprise a toothed wheel in co-axial relationship and secured to the worm, a member pivoted on the axis of the toothed wheel, a pawl pivoted on the said member and adapted to be moved relatively thereto into engagement with the toothed wheel, a manually operable pivoted lever connected to the pawl, and adjustable means for defining the angular movement imparted to the pivoted lever.

5. A combined copy-holder and adjusting device as claimed in claim 1, in which the means for imparting rotation to the worm comprise a toothed wheel in co-axial relationship and secured to the worm, a member pivoted on the axis of the toothed wheel, a pawl pivoted on the said member and adapted to be moved relatively thereto into engagement with the toothed wheel, a manually operable pivoted lever connected to the pawl, adjustable means for defining the angular movement imparted to the pivoted lever, and spring means for automatically returning the pivoted lever together with the pawl and its supporting member to their initial positions upon the pivoted lever being released after being manually operated.

6. In combination with a copy-holder having a movable copy-carrying part, an adjusting device whereby the said part can be raised and lowered, which adjusting device includes transmission mechanism disconnectable at will, braking means for controlling the movement of the said copy-carrying part when the gearing is disengaged.

HAIM SHROITMAN.